US011795962B2

United States Patent
Perisho et al.

(10) Patent No.: US 11,795,962 B2
(45) Date of Patent: Oct. 24, 2023

(54) SHEAR PIN AND DRIVE SHAFT SPRING BRAKE IN ELECTRICAL SUBMERSIBLE PUMP

(71) Applicant: Baker Hughes Oilfield Operations LLC, Houston, TX (US)

(72) Inventors: Randal Perisho, Tulsa, OK (US); Zheng Ye, Claremore, OK (US)

(73) Assignee: BAKER HUGHES OILFIELD OPERATIONS, LLC, Houston, TX (US)

( * ) Notice: Subject to any disclaimer, the term of this patent is extended or adjusted under 35 U.S.C. 154(b) by 123 days.

(21) Appl. No.: 17/233,207

(22) Filed: Apr. 16, 2021

(65) Prior Publication Data

US 2021/0324867 A1 Oct. 21, 2021

Related U.S. Application Data

(60) Provisional application No. 63/011,525, filed on Apr. 17, 2020.

(51) Int. Cl.
*F04D 29/044* (2006.01)
*F04D 15/02* (2006.01)
(Continued)

(52) U.S. Cl.
CPC ............ *F04D 29/044* (2013.01); *E21B 4/006* (2013.01); *E21B 43/128* (2013.01);
(Continued)

(58) Field of Classification Search
CPC ........ E21B 43/128; E21B 4/006; F04D 13/10; F04D 13/086; F04D 13/021;
(Continued)

(56) References Cited

U.S. PATENT DOCUMENTS

| 2,895,578 A | * | 7/1959 | Winchell | .............. F16D 41/206 |
| | | | | 192/72 |
| 3,227,086 A | * | 1/1966 | Haworth | ................. F04B 47/02 |
| | | | | 417/246 |

(Continued)

FOREIGN PATENT DOCUMENTS

| JP | H0874889 A | 3/1996 |
| JP | 2558211 Y2 | 12/1997 |

(Continued)

OTHER PUBLICATIONS

International Search Report and Written Opinion for related PCT application PCT/US2019/037602 dated Oct. 2, 2019: pp. 1-9.
International Search Report and Written Opinion of PCT Application No. PCT/US2021/027955 dated Jul. 30, 2021: pp. 1-11.
International Preliminary Report on Patentability, Application No. PCT/US2021/027955, dated Oct. 27, 2022.

*Primary Examiner* — Peter J Bertheaud
(74) *Attorney, Agent, or Firm* — BRACEWELL LLP; Keith R. Derrington (57) ABSTRACT

An electrical submersible well pump assembly (ESP) has a spring brake having helical turns mounted between the shaft and one of the housings. The spring brake allows free rotation of the shaft in a driving direction and stops the shaft from rotating in a reverse direction. The spring brake may have one end be affixed to the housing to rotate in unison in both directions. Alternately, the spring brake may have one end affixed to the shaft for rotation with the shaft. Further, the spring brake could be free of being connected to either the shaft or the housing. A shear member may be mounted between the shaft and the housing to prevent any rotation of the shaft during run-in.

20 Claims, 7 Drawing Sheets

(51) Int. Cl.
*F04D 13/10* (2006.01)
*F16D 41/20* (2006.01)
*E21B 4/00* (2006.01)
*F04D 13/08* (2006.01)
*F04D 13/02* (2006.01)
*E21B 43/12* (2006.01)
*F16D 43/18* (2006.01)
*F16D 7/02* (2006.01)
*F16D 1/10* (2006.01)

(52) U.S. Cl.
CPC ......... *F04D 13/021* (2013.01); *F04D 13/022* (2013.01); *F04D 13/086* (2013.01); *F04D 13/10* (2013.01); *F04D 15/02* (2013.01); *F16D 7/022* (2013.01); *F16D 41/206* (2013.01); *F16D 43/18* (2013.01); *F16D 2001/103* (2013.01)

(58) Field of Classification Search
CPC ...... F04D 29/044; F04D 13/022; F04D 15/02; F16D 41/206; F16D 2001/103; F16D 43/18; F16D 7/022
See application file for complete search history.

(56) References Cited

U.S. PATENT DOCUMENTS

| | | | | |
|---|---|---|---|---|
| 3,450,365 | A * | 6/1969 | Kaplan | F16D 7/022 242/415.1 |
| 4,527,683 | A * | 7/1985 | Mathews | F16F 1/06 188/71.9 |
| 4,763,764 | A * | 8/1988 | Smith | F16D 43/18 192/72 |
| 5,350,242 | A | 9/1994 | Wenzel | |
| 6,695,112 | B1 * | 2/2004 | Webber | F16D 41/206 192/81 C |
| 2002/0056602 | A1 | 5/2002 | Aurora | |
| 2005/0103501 | A1 | 5/2005 | Howlett | |
| 2011/0171047 | A1 | 7/2011 | Parmeter et al. | |
| 2015/0275581 | A1 | 10/2015 | Agarwal et al. | |
| 2020/0063541 | A1 | 2/2020 | Davis | |

FOREIGN PATENT DOCUMENTS

| | | |
|---|---|---|
| JP | 2007309408 A | 11/2007 |
| WO | 2010030272 A1 | 3/2010 |

\* cited by examiner

SHEAR PIN AND DRIVE SHAFT SPRING BRAKE IN ELECTRICAL SUBMERSIBLE PUMP

CROSS-REFERENCE TO RELATED APPLICATION

This application claims priority to provisional application Ser. No. 63/011,525 filed Apr. 17, 2020.

FIELD OF THE DISCLOSURE

This disclosure relates in general to electrical submersible well pumps (ESP), and in particular to a shear mechanism that prevents spinning of the drive shaft assembly during running of the ESP, and a spring brake device that prevents spinning of the drive shaft assembly in reverse due to well fluid flow through the pump while the motor is not being powered.

BACKGROUND

ESPs are commonly used in hydrocarbon producing wells. A typical ESP includes an electrical motor having a rotating drive shaft that drives the pump. The pump may be a centrifugal pump or another type. The motor is typically a three-phase AC motor of an induction electric type, but permanent magnet motors are also employed.

There are occasions when well fluid flows through the pump while the motor is not being powered. The flowing well fluid can cause the motor shaft to spin, which can generate an electrical charge, particularly if the motor is a permanent magnet type. The electrical charge can be dangerous to nearby technicians. One instance can occur when the ESP is being run into the well on production tubing. Well fluid can flow up through the pump, resulting in forward spinning of the motor shaft. A power cable is normally being deployed at the same time and strapped onto the production tubing every 20 feet or so. The terminals at the upper end of the power cable could be exposed.

Another instance occurs upon retrieval with production tubing. Technicians at the wellhead will be stopping the upward pull every 20 feet or so to remove the straps of the power cable to the tubing. Well fluid previously in the pump can drain out the pump intake, causing the pump to reverse spin. The reverse spinning of the pump causes reverse spinning of the motor shaft, which can also generate an electrical charge. The electrical charge could be present on the terminals of the power cable, which would may be disconnected from the power supply during retrieval.

In addition, when the ESP is shut down, the column of well fluid in the tubing can flow downward through the pump, causing reverse spinning of the motor shaft. The reverse spinning motor shaft can generate an electrical charge.

Helical spring brakes are known to be used on helicopter shafts and washing machine shafts. However, helical spring brakes have not been configured and mounted to ESP shaft assemblies.

SUMMARY

An electrical submersible well pump assembly (ESP) comprises a pump and an electrical motor. The motor and the pump have a bore. A rotatable shaft assembly extends through the bore from the motor into the pump for driving the pump. A spring brake has helical turns. Means for configuring and mounting the spring brake between the shaft assembly and a sidewall of the bore allows free rotation of the shaft assembly in a driving direction and stops the shaft assembly from rotating in a reverse direction. The spring brake may be located in a portion of the bore within the motor.

The means for configuring and mounting the spring brake may comprise a clamp that clamps a first portion of the spring brake rigidly to the shaft assembly for rotation with the shaft assembly in the driving direction. A second portion of the spring brake is closely spaced to the sidewall of the bore. The helical turns are arranged such that commencing rotation of the shaft assembly in the reverse direction causes the second portion of the spring brake to move radially outward into frictional engagement with the sidewall of the bore to stop further reverse direction rotation of the shaft assembly. The spring rotates with the shaft and brakes against the housing bore.

Alternately, the spring can be fixed and brake against the shaft. In this embodiment, the means for configuring and mounting the spring brake may comprise a tang extending from a first end of the spring brake and secured to the sidewall of the bore, preventing rotation of the shaft assembly when it rotates in the wrong direction. Rotation of the shaft assembly in the driving direction causes the helical turns to increase in diameter, creating a gap between the shaft assembly and the helical turns. Commencing rotation of the shaft assembly in the reverse direction causes the helical turns to decrease in diameter, closing the gap and gripping the shaft assembly to stop further reverse direction rotation of the shaft assembly.

In another alternate embodiment, the means for configuring and mounting the spring brake comprises first and second portions integrally formed together. The first portion has helical turns extending in a first direction. The second portion has helical turns extending in a second direction. The inner diameter of the first portion is less than an outer diameter of the shaft assembly during driving rotation of the shaft assembly. The outer diameter of the second portion is greater than the inner diameter of the housing bore during driving rotation of the shaft assembly. Commencing rotation of the shaft assembly in the reverse direction decreases the inner diameter of the first portion, causing the first portion to grip the shaft, and increases the outer diameter of the second portion, causing the second portion to grip the sidewall of the bore to stop further reverse direction rotation of the shaft assembly.

Stated another way, the means for configuring and mounting the spring brake may comprise a first portion of the helical turns closely spaced to the shaft assembly. A second portion of the helical turns is closely spaced to the sidewall of the hub. The helical turns in the first and second portions are wound to allow driving direction rotation of the shaft assembly. Commencing reverse rotation of the shaft assembly causes the first and second portions to move radially to grip the shaft assembly and the sidewall of the bore to prevent further reverse rotation of the shaft assembly. In this embodiment, the spring brake is free of attachment to the sidewall of the bore and to the shaft assembly.

In the embodiments shown, a shear member may extend between the shaft assembly and the sidewall of the bore. The shear member prevents any rotation of the shaft assembly while the ESP is being lowered into the well. The shear member is configured to shear when power is supplied to the motor, allowing the shaft assembly to rotate in the driving direction.

More particularly, the shaft assembly comprises a plurality of shafts connected together by splined couplings. In one embodiment, the shear member comprises a shear pin extending through a hole in the sidewall of the bore into a hole within one of the couplings. The shear pin has a threaded outer portion that engages threads within the hole in the sidewall of the bore. An inner portion is within the hole in the coupling. An intermediate portion is between the inner and outer portions. An annular groove surrounds the intermediate portion, providing a weak point in the shear pin. A snap ring surrounds the inner portion of the shear pin to retain the inner portion in the hole in the coupling after the shear pin shears.

DETAILED DESCRIPTION OF THE DISCLOSURE

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/− 5% of the cited magnitude. In an embodiment, usage of the term "substantially" includes +/− 5% of the cited magnitude. The terms "upper", "lower" and the like are used only for convenience as the ESP may be operated in positions other than vertical.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Figure 1:
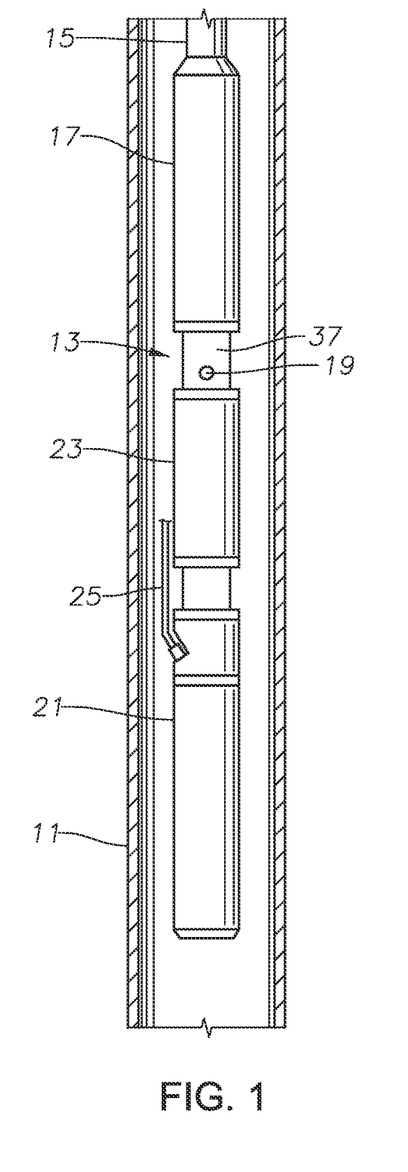
FIG. 1 is a side view an ESP supported on tubing, the ESP being in accordance with this disclosure.

Referring to FIG. 1, the well has a casing 11 cemented in place. In this embodiment, a wellhead (not shown) at the surface supports an electrical submersible pump (ESP) 13 on a string of production tubing 15. ESP 13 includes a pump 17, which is illustrated to be a centrifugal pump, but positive displacement pumps are feasible. Pump 17 has an intake port 19 for drawing in well fluid from casing 11 and discharging the well fluid into production tubing 15.

A motor 21 drives pump 17. Motor 21 is typically a three-phase electrical motor filled with a dielectric lubricant. Motor 21 may be a permanent magnet motor having a rotor containing permanent magnets that rotate in response to electromagnetic fields of a non-rotating stator. A seal section 23 connected between motor 21 and pump 17 has a pressure equalizer that reduces a pressure differential between the lubricant in motor 21 and well fluid on the exterior. Alternately, the pressure equalizer could be mounted below motor 21. A power cable 25 with a motor lead extension on its lower end extends downward from the wellhead alongside production tubing 15 to an upper portion of motor 21 for powering motor 21.

Rather than production tubing 15, ESP 13 could be supported on a string of coiled tubing, which is a continuous flexible steel tube deployed from a reel at the surface. The coiled tubing has a power cable inside rather than on the exterior. In that instance, motor 21 would be above pump 17, and pump 17 would discharge into an annulus surrounding motor 21.

Figure 2:
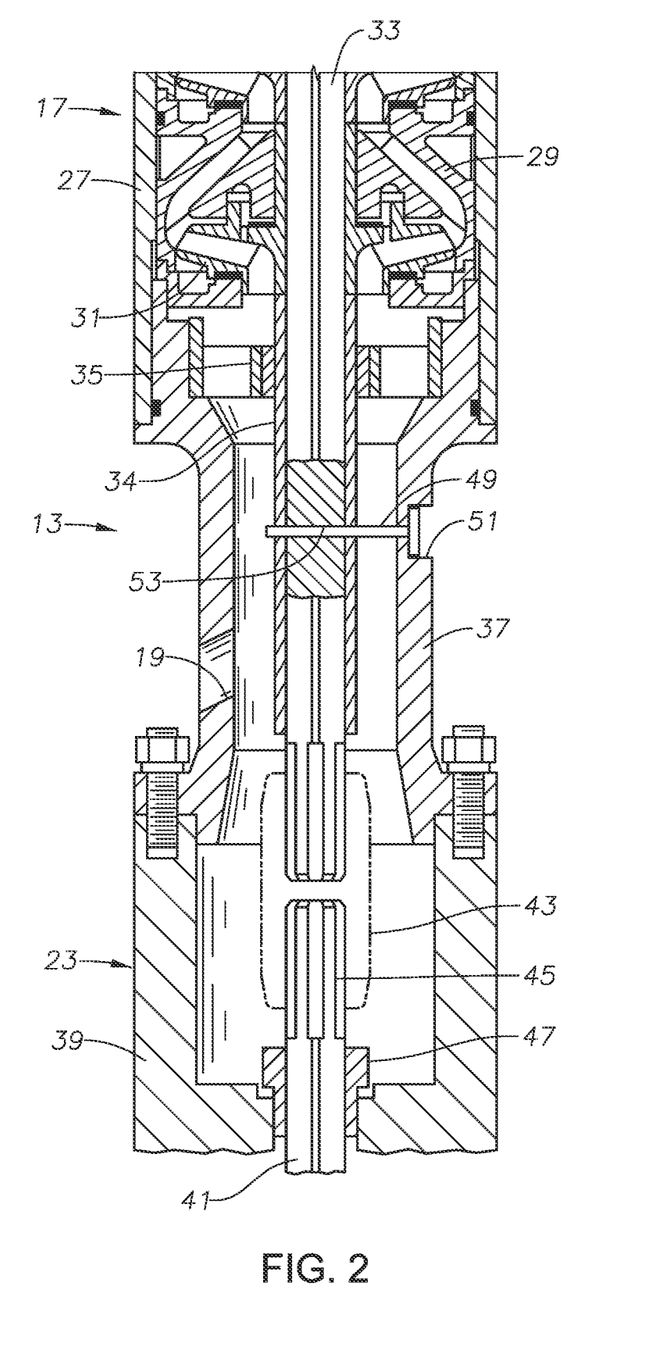
FIG. 2 is a sectional view of a lower portion of the pump and upper portion of the seal section of FIG. 1, illustrating a shear pin that prevents rotation of the pump shaft and the motor shaft while lowering the pump into a well.

Referring to FIG. 2, pump 17 has a cylindrical housing 27 containing a large number of stages, each stage having a non-rotating diffuser 29 and a rotating impeller 31. Impellers 31 are keyed to a pump shaft 33 for rotation in unison. Spacer sleeves 34 that receive pump shaft 33 may extend between hubs of adjacent impellers 31. Shaft 33 and one of the spacer sleeves 34 extend through radial stabilizing bearings 35 (only one shown) at the top and bottom of the pump stages.

In this example, an intake member 37, which contains intake ports 19, secures by threads to the lower end of pump housing 27. If a gas separator is employed to separate gas from liquid well fluid prior to entering pump 17, intake ports 19 would be in the gas separator.

Intake member 37 may have a smaller outer diameter than pump housing 27 and secures by bolts, in this example, to a head 39 of seal section 23. Seal section 23 has a seal section shaft 41 with an upper end that secures to the lower end of pump shaft 33 with a coupling 43. The upper end of seal section shaft 41 and the lower end of pump shaft 33 have external splines 45 that engage internal splines in coupling 43. Coupling 43 rotationally locks pump haft 33 to seal section shaft 41 for rotation in unison in both a pump driving direction and in a reverse direction.

Seal section head 39 has an upward-facing recess at its upper end that contains a shaft seal 47 sealing around seal section shaft 41. Shaft seal 47 may be a mechanical face seal for preventing the entry of well fluid into a pressure equalizer (not shown) in seal section 23. The pressure equalizer may be a bag or bellows filled with lubricant that is in fluid communication with motor lubricant in motor 21 (FIG. 1). The exterior of the pressure equalizer is exposed to well fluid pressure.

In the embodiment of FIG. 2, a shear mechanism prevents both pump shaft 33 and seal section shaft 41 from rotating in either direction prior to powering motor 21 (not shown). The shear mechanism may be a shear pin 49 that extends radially through a hole 51 in the sidewall of intake member 37 and a mating hole 53 in pump shaft 33. In this example, shear pin 49 extends completely through pump shaft 33 and has a protruding portion on the opposite side. Shear pin 49 is illustrated as being immersed in well fluid a short distance above intake ports 19, but it could be aligned with intake ports 19 or below. If spacer sleeves 34 extend downward to the pump shaft splines 45, as in this example, pump shaft hole 53 also extends through the lowermost spacer sleeve 34. Alternately, the lowermost spacer sleeve 34 could terminate above shaft hole 53. It would also be feasible to place shear pin 49 at other points along the shaft assembly comprising pump shaft 33, seal section shaft 41 and the shaft within motor 21.

Figure 3:
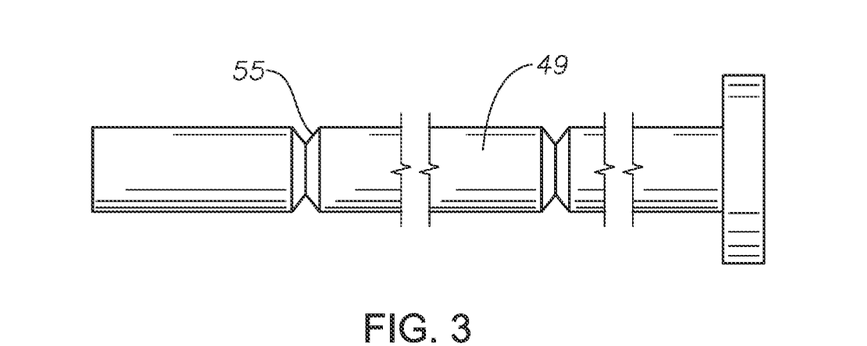
FIG. 3 is a side view of the shear pin of FIG. 2, shown removed from the pump.

FIG. 3 illustrates shear pin 49 as having two notches 55 spaced apart from each other a distance slightly greater than the outer diameter of pump shaft 33 and one of the spacer sleeves 34 if one is present at shaft hole 53. Notches 55 extend circumferentially around shear pin 49 and serve to facilitate shearing of shear pin 49 close to the outer diameter of pump shaft 33.

While ESP 13 is being lowered into the well, well fluid contained in casing 11 can enter intake ports 19 and move upward through the pump stages. Without shear pin 49, this downward movement of ESP 13 can cause impellers 31 to rotate pump shaft 33 in the normal or driving direction. Rotation of pump shaft 33 would cause rotation of other parts of the shaft assembly, including seal section shaft 41 and the shaft in motor 21, possibly resulting in an electrical charge in power cable 25 (FIG. 1). Shear pin 49 prevents rotation of the shaft assembly. Once ESP 13 is installed and motor 21 powered, the shaft assembly rotates in a driving direction, shearing shear pin 49.

Figure 4:
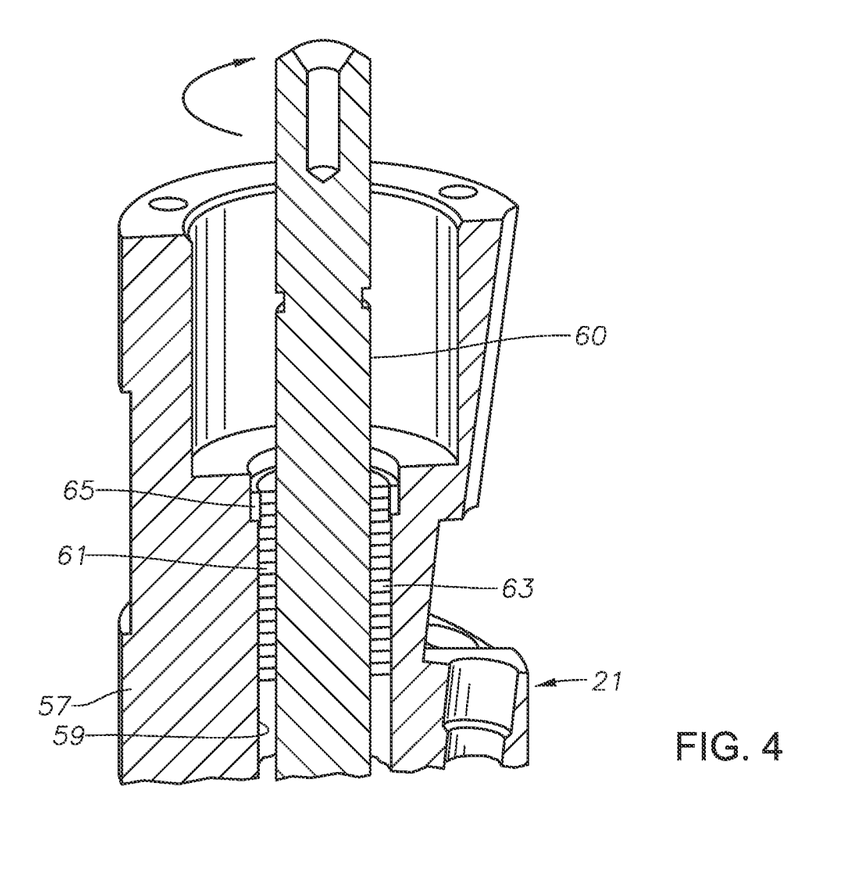
FIG. 4 is a perspective view of a motor head of the motor of the ESP of FIG. 1, illustrating a spring brake that prevent reverse rotation of the motor shaft.

FIGS. 4-12 illustrate three versions of a brake mechanism that prevents reverse spinning of the shaft assembly after shear pin 49 (FIG. 2) has sheared. Referring to FIG. 4, motor 21 has housing 57. Housing has a motor bore 59 through which motor shaft 60 extends. FIG. 4 does not illustrate certain components, such as a motor thrust bearing and the connectors for power cable 25. Motor shaft 60 has an upper end that has splines for rotationally coupling to the lower end of seal section shaft 41 (FIG. 2). Motor lubricant in motor 21 communicates with the lubricant in the pressure equalizer of seal section 23 (FIG. 1) via an annular passage between shaft 60 and bore 59.

Figure 5:
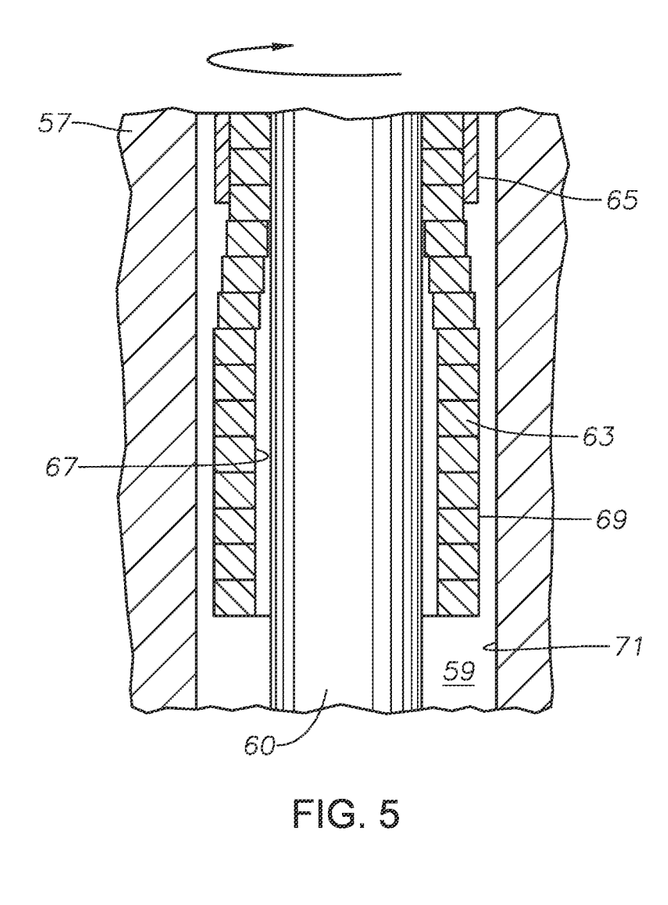
FIG. 5 is a sectional view of the spring brake of FIG. 4 installed in the motor and illustrating the position of the spring brake during normal or driving rotation of the motor shaft.
Figure 6:
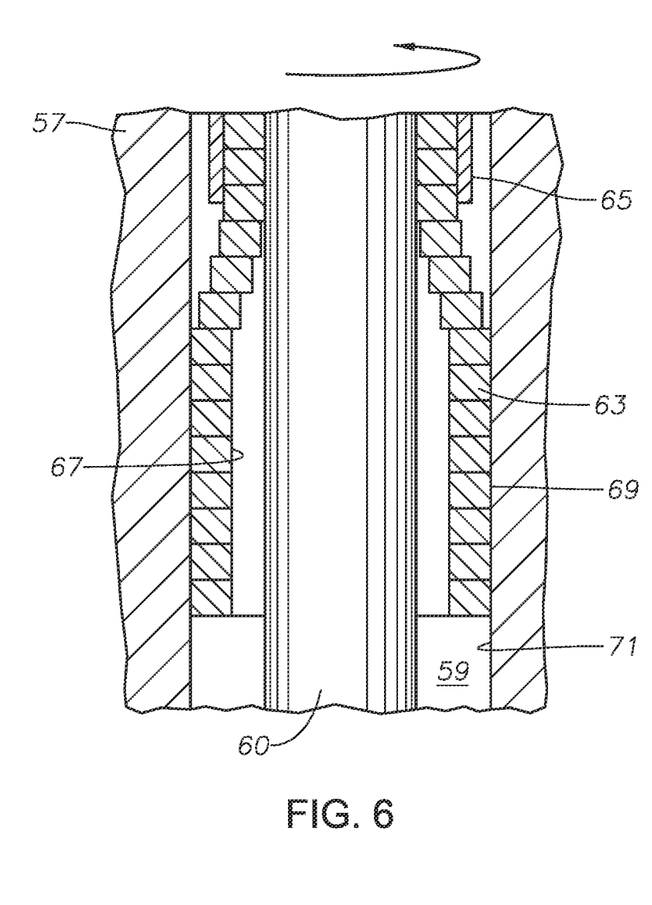
FIG. 6 is a sectional view similar to FIG. 5, but showing the spring brake in a locking position, preventing the motor shaft from spinning in reverse.
Figure 7:
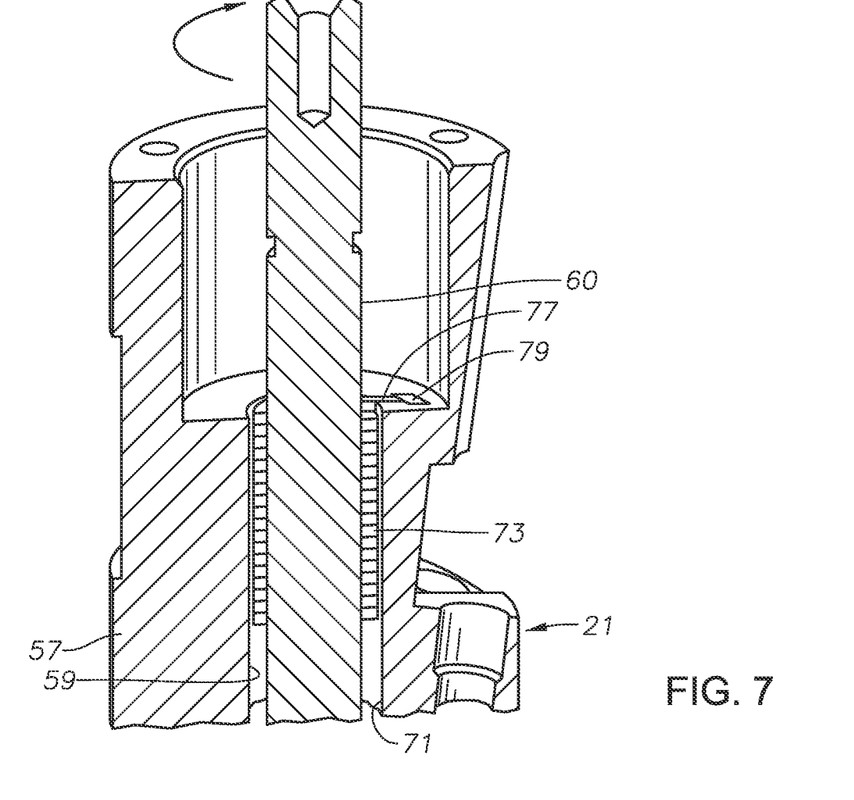
FIG. 7 is a perspective view of the upper end of the motor and an alternate embodiment of a spring brake, wherein the spring brake has a tang at one end affixed to the motor head.
Figure 8:
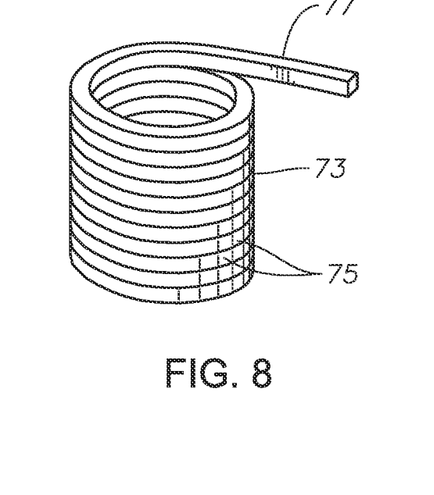
FIG. 8 is a perspective view of the spring brake of FIG. 7, shown removed from the motor.
Figure 9:
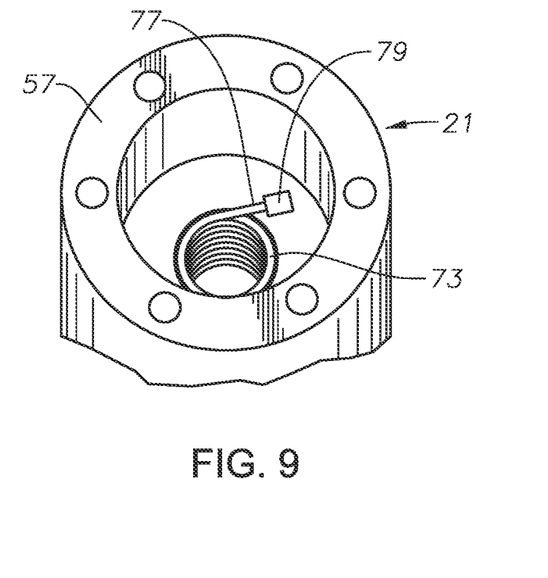
FIG. 9 is a perspective view of the upper end of the spring brake of FIG. 7, shown installed in the motor head.

In FIGS. 4-6, the brake mechanism to prevent reverse spinning of motor shaft 60, seal section shaft 41 and pump shaft 33 comprises a spring brake 61. Spring brake 61 is a metal coiled strip that has a number of helical turns 63 extending from a lower end to an upper end. Both the lower and upper ends of helical turns 63 are free prior to installation in motor 21. Spring brake 61 may be manufactured by making a helical cut through the wall of a tubular block of metal. When viewed in an axial cross-section, as shown in FIGS. 5 and 6, each helical turn 63 has a rectangular shape in this example. When viewed from the upper end, helical turns 63 define a helical path extending around motor shaft 60 that turns in the same direction as the driving direction of motor shaft 60, which is clockwise in this example.

One end of spring brake 61, shown to be the upper end, is fixed to motor shaft 60 for rotation therewith. In this embodiment, a clamp 65 clamps the upper portion of spring brake 61 tightly to motor shaft 60. Clamp 65 may be a solid annular member that employs a thermal process to cause it to shrink in diameter so that it can be first inserted over spring brake 61, then shrunk to tightly clamp the upper end of spring brake 61 to motor shaft 60. For example, clamp 65 may be a shape memory alloy such as Nitinol that shrinks when heat is applied and retains the smaller diameter after the heat is removed.

Clamp 65 clamps only the upper few turns 63 of spring brake 61, and the remaining turns 63 retain their original diameter. When motor shaft 60 is either not rotating or rotating in a driving direction, as indicated by the arrow in FIG. 5, the inner diameter 67 of the lower portion of spring brake 61 may be spaced from the outer diameter of motor shaft 60, or it may be slightly touching. The outer diameter 69 of the lower portion of spring brake 61 will be spaced a slight distance inward from bore sidewall 71, or it could be touching.

Spring brake outer diameter 69 does not grip bore sidewall 71 while shaft 60 rotates in the driving direction. There will be a very slight clearance oil film between spring brake outer diameter 69 and bore sidewall 71. Although spring brake 61 rotates with motor shaft 60, it does not impede motor shaft 60 from driving seal section shaft 41 (FIG. 2) and pump shaft 33 in a driving direction because spring brake 61 will not be gripping bore sidewall 71. The arrow in FIG. 5 indicates the driving direction to be clockwise, but the driving direction alternately could be clockwise. In that case helical turns 63 would extend in the opposite direction.

If motor shaft 60 starts to spin in reverse, as indicated by the arrow in FIG. 6, the helical turns 63 below clamp 65 begin to unwind or move radially outward due to centrifugal force. The lower portion of helical turns 63 will now tightly grip bore sidewall 71. The friction imposed is sufficient to stop the reverse rotation of motor shaft 60, preventing motor 21 from generating an electrical charge.

The commencement of reverse rotation could occur during retrieval of ESP 13 in response to well fluid draining downward through pump 17 (FIG. 1). The commencement of reverse rotation could also occur when motor 21 is shut down. Well fluid in production tubing 15 (FIG. 1) may flow back down through pump 17, causing the shaft assembly to spin in reverse. Although spring brake 61 is shown in the upper end of housing 57, it could also be mounted in the base or lower end of motor 21.

In the second embodiment, FIGS. 7-11, components that are the same as in the first embodiment are either not mentioned or shown with the same reference numeral. Spring brake 73 has one end affixed to housing 57, preventing rotation with shaft 60 in the driving direction. In this example, spring brake 73 is also inserted over motor shaft 60 in motor bore 59. Spring brake 73 has helical turns 75 similar to helical turns 63 of spring brake 61 in the first embodiment. Helical turns 75 turn in the driving direction, as viewed from the top. Spring brake 73 differs from spring brake 61 in that it has a tang 77 at one end, shown to be the upper end, of helical turns 75. Tang 77 is an outward protruding leg extending along a tangent line of the upper end of helical turns 75. Tang 77 is affixed to housing with a schematically shown retainer 79.

Figure 10:
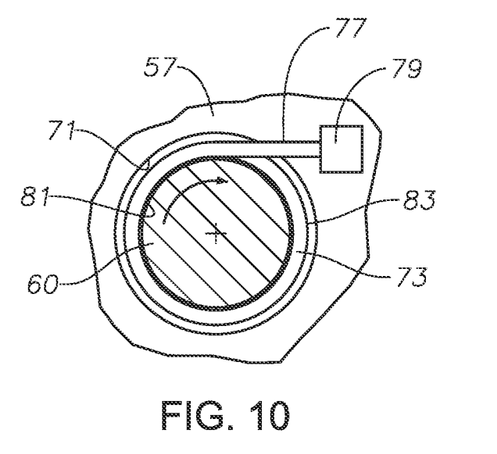
FIG. 10 is a top view of the spring brake of FIG. 7 while in a position that occurs during normal or driving rotation.

When initially installed, spring brake 73 has an inner diameter 81 that is touching the outer diameter of motor shaft 60, as shown in FIG. 10, and exerting a slight gripping force. Spring brake 73 has an initial outer diameter 83 that is spaced slightly inward from bore sidewall 71. When motor 21 is powered, the driving direction rotation of motor shaft 60 will cause inner diameter 81 to increase and allow rotation of shaft 60. The expansion of the spring brake 73 in the driving directions occurs because of the slight frictional drag between shaft 60 and spring brake inner diameter 81. Because of tang 77, spring brake 73 does not rotate during the driving rotation of motor shaft 60.

Figure 11:
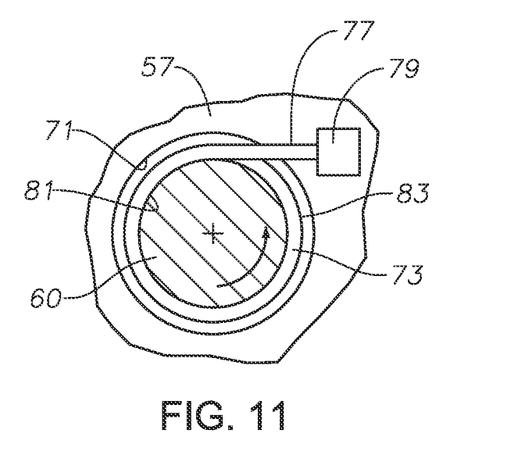
FIG. 11 is a top view similar to FIG. 10, but showing the spring brake in a braking position, which occurs when the motor shaft tries to rotate in reverse.

If motor shaft 60 commences to rotate in reverse, as shown in FIG. 11, the reverse rotation will causes spring brake 73 to decrease in inner diameter 81, tightly gripping the outer diameter of motor shaft 60 and preventing reverse spinning. Tang 77 prevents spring brake 73 from rotating in reverse.

Figure 12:
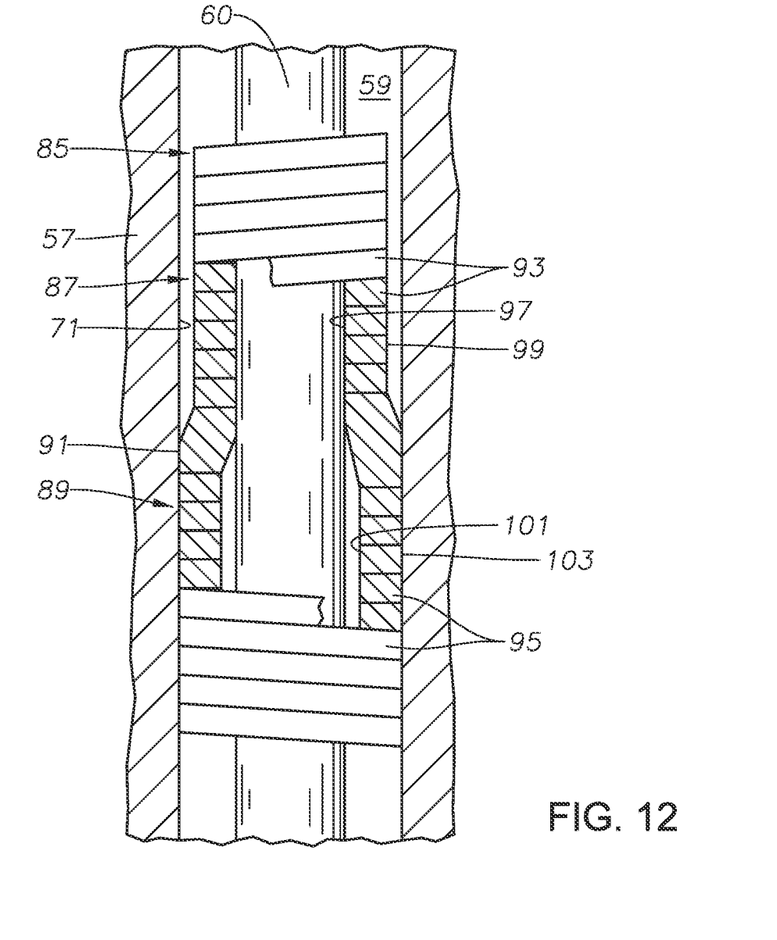
FIG. 12 is a schematic sectional view of a third embodiment of a spring brake and a portion of the motor shaft and motor head.

In the embodiment of FIG. 12, spring 85 is free of attachment to either shaft 60 or to housing 57. In this example, the sidewall of the spring 85 has a first portion 87 and a second portion 89 integrally connected together by a mid-portion 91. Spring 85 may be manufactured integrally from a single monolithic tube of metal. First portion 87 has helical turns 93 that turn in an opposite direction to second portion helical turns 95. First portion 87 has an inner diameter 97 that initially grips motor shaft 60 while motor shaft 60 is not turning. First portion 87 has an outer diameter 99 that is spaced by an annular clearance from bore sidewall 71 while motor shaft 60 is not turning.

Second portion 95 has an inner diameter 101 that is spaced by an annular clearance from motor shaft 60 while it is not turning. Second portion 95 has an outer diameter 103 that may be in slight contact with or spaced from bore sidewall 71 while motor shaft 60 is not turning.

Rotation of motor shaft 60 in the driving direction occurs freely. The reason is that the driving direction rotation causes inner diameter 97 of first portion helical turns 93 to expand and outer diameter 103 of second portion helical turns 95 to contract. Spring 85 may revolve slowly because of a slight interference fit on shaft 60, but it does not prevent rotation of motor shaft 60 in the driving direction. The commencement of reverse direction rotation will cause the reverse to occur. First portion helical turns 93 shrink in inner diameter 97, tightly gripping motor shaft 60. Second portion helical turns 95 expands in outer diameter 103, tightly gripping bore sidewall 71 and preventing rotation of shaft 60 in the reverse direction.

Rather than having two portions of oppositely wound helical turns 93, 95 in the FIG. 12 embodiment, all of the helical turns could extend in the same direction. In that event, shaft assembly 60 would include a hub or spool (not shown) rigidly attached to it for rotation in unison. A shaft engaging portion of the helical turns would be located inside of the spool in a slight interference fit with the inner diameter of the spool. The remaining portion of the helical turns would be closely spaced to the sidewall of housing 57, which could have the same inner diameter as the interior of the spool. The helical turns would allow free rotation of shaft 60 in the driving direction, although some slow rotation of the spring brake might occur due to the slight interference fit. When shaft 60 starts to rotate in the reverse direction, both portions of the spring brake tend to unwind and expand radially outward, frictionally locking shaft 60 to housing 57. The portion engaging the inner diameter of the spool would grip the spool more tightly. The portion engaging the inward-facing sidewall of housing 57 would tightly grip housing 57.

Figure 13:
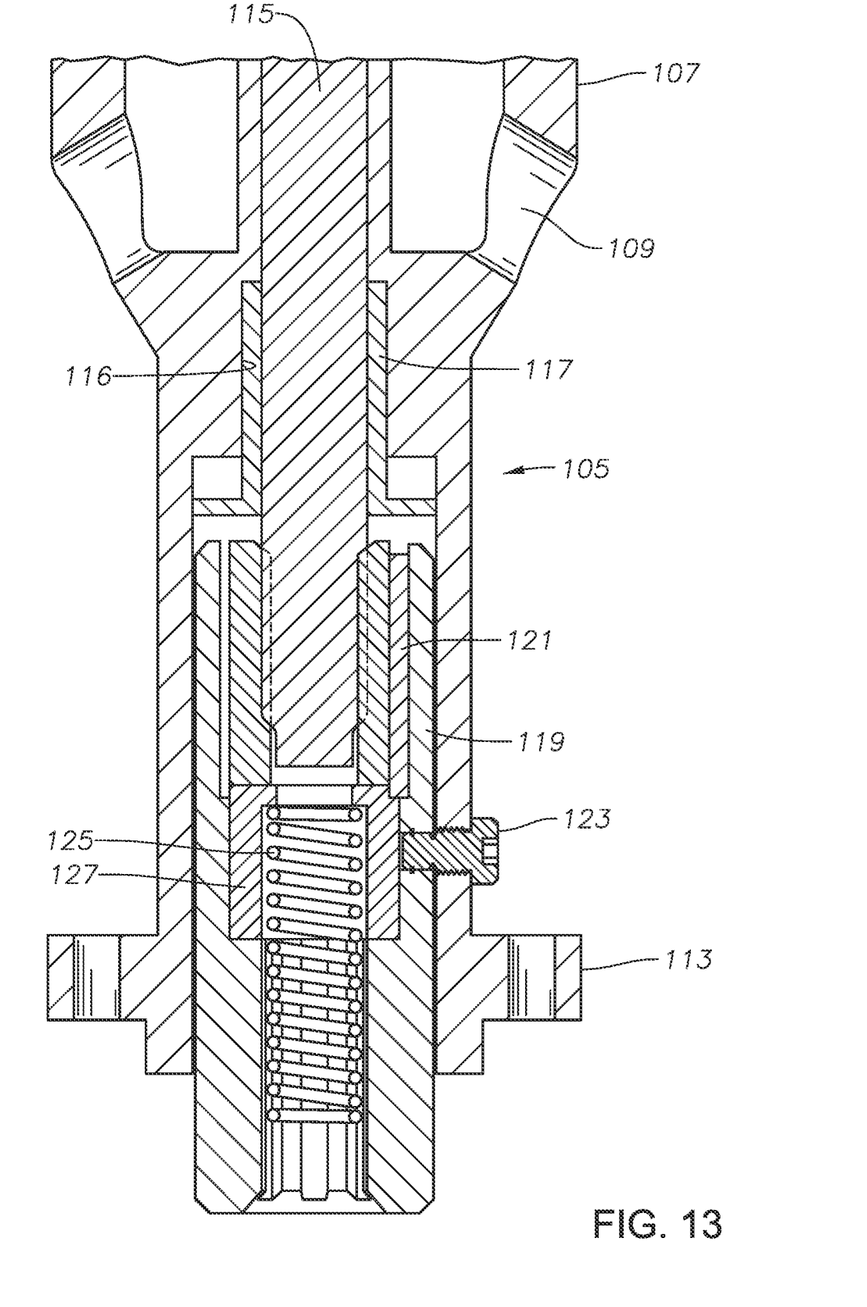
FIG. 13 is a sectional view of another type of intake member with a shear pin in accordance with this disclosure.
Figure 14:
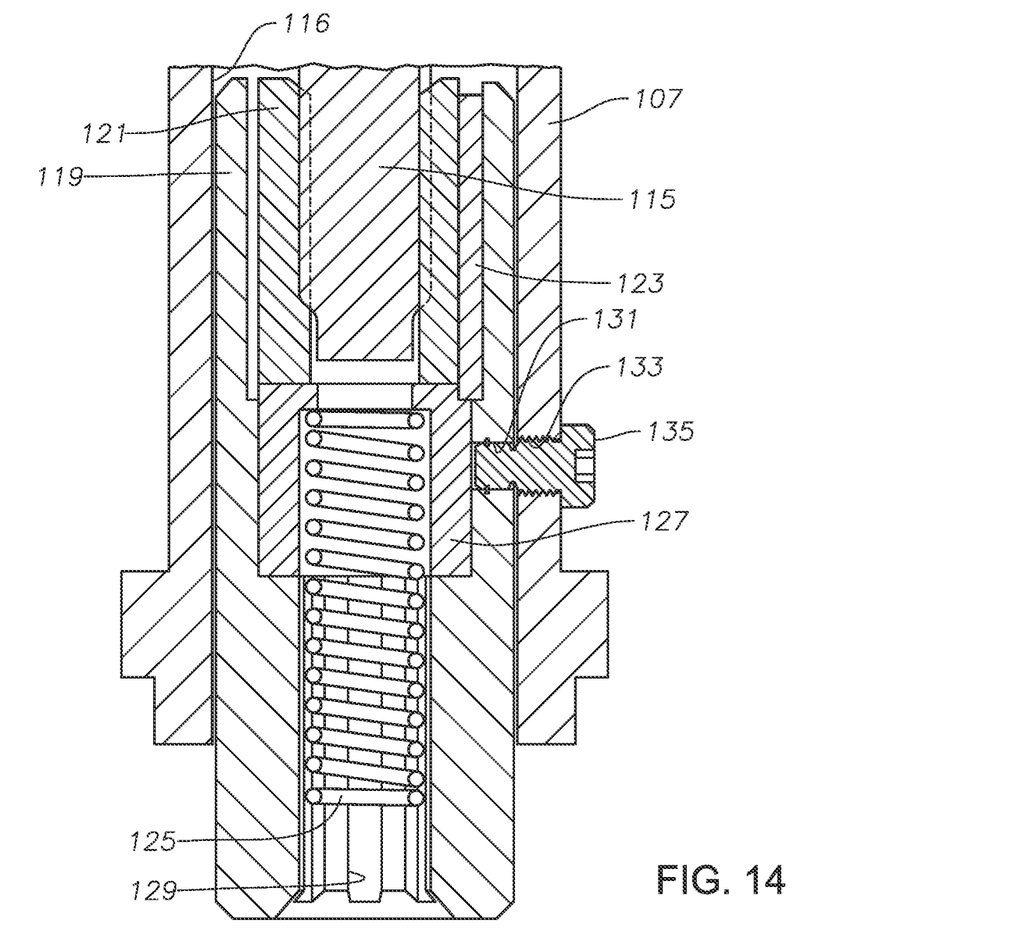
FIG. 14 is an enlarged sectional view of the portion in FIG. 13 shown by a dotted encircled line.

Referring to FIG. 13, in this embodiment, pump intake member 105 is a separate bolted module from pump 17 (FIG. 1), rather than a lower part of pump 17 as in FIG. 1. Intake member 105 has a tubular housing 107 with intake ports 109 for receiving well fluid. Threaded bolt holes (not shown) in the upper end of housing 107 enable intake member 105 to be connected to a connector flange (not shown) on the pump 17. A connector flange 113 on the lower end of pump intake member 105 has bolt holes for connecting the lower end of intake member 105 to seal section 23 (FIG. 1).

In this example, intake member 105 has a separate drive shaft 115 from pump drive shaft 33 (FIG. 2). Intake member shaft 115 extends through a bore 116 in housing 107 that has a bearing 117 to provide radial support for intake member shaft 115. The upper end (not shown) of intake member shaft 115 has a splined end that connects to the lower end of pump shaft 33 with an internally splined coupling.

A coupling 119 in bore 116 below bearing 117 of intake member housing 107 connects the lower end of intake member shaft 115 to drive shaft 45 (FIG. 2) of seal section 23 (FIG. 2). Coupling 119 may have an insert sleeve 121 in its bore that is secured for rotation in unison with coupling 119 by pins 123 (only one shown). The lower splined end of intake member shaft 115 engages internal splines in insert sleeve 121. The lower portion of coupling 119 may have a coil spring 125 held at its upper end by a threaded retainer 127. Coupling 119 has a lower splined socket 129 that receives the upper splined end of seal section shaft 45 (FIG. 2), compressing coil spring 125.

Figure 15:
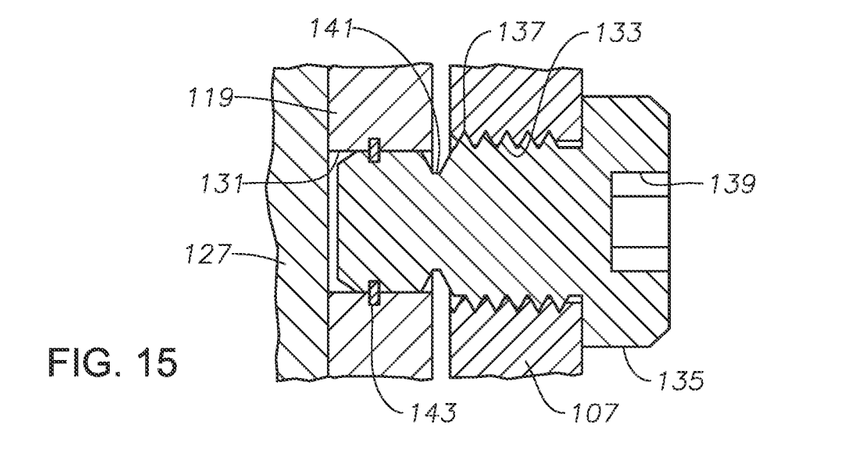
FIG. 15 is an enlarged sectional view of the shear pin shown in FIG. 14.

Referring to FIG. 15, coupling 119 has one or more coupling holes 131 extending radially through its side wall. Coupling hole 131 radially and axially aligns with a shear pin hole 133 extending through the side wall of intake member housing 107. Prior to running ESP 13 (FIG. 1), a shear pin 135 will be inserted into the mating holes 131, 133.

Shear pin 135 may be secured in various manners. In the embodiment shown, shear pin 135 has an outer portion that is threaded shank 137 that engages mating threads in hole 133 in housing 107. A receptacle 139 on its outer end enables a technician to tighten shear pin 135, causing its inner portion to insert into coupling hole 131. Shear pin 135 has an annular notch or groove 141 in an intermediate portion that is located in the gap between coupling 119 and housing 107. A snap ring 143 engages mating annular grooves in the inner portion of shear pin 135 and in hole 133.

Shear pin 135 prevents rotation of pump shaft 33 (FIG. 2), seal section shaft 41 (FIG. 1) and motor shaft 60 while ESP 13 is being lowered into the well during installation. When motor 21 (FIG. 1) starts, the torque applied to motor shaft 60 will cause shear pin 135 to shear.

Shear pin 135 is located below intake ports 109 in this embodiment and within a portion of housing bore 116 that is only slightly larger in diameter than coupling 119. After shearing, it is important to avoid sheared pieces of shear pin 135 from damaging other components of ESP 13 during operation. Snap ring 143 retains the inner portion of shear pin 135 after shearing. Alternatively, the inner portion of shear pin 135 could be glued in coupling hole 131. Other means to retain the inner portion of shear pin 135 after shearing are feasible.

The present invention described herein, therefore, is well adapted to carry out the objects and attain the ends and advantages mentioned, as well as others inherent therein. While only a few embodiments of the invention have been given for purposes of disclosure, numerous changes exist in the details of procedures for accomplishing the desired results. These and other similar modifications will readily suggest themselves to those skilled in the art, and are intended to be encompassed by the scope of the claims. For example the spring brakes could be mounted around the seal section shaft 41 or the pump shaft 33 instead of to the motor shaft 60.

The invention claimed is:

1. An electrical submersible well pump assembly (ESP), comprising:
   a pump;
   an electrical motor;
   a bore within the motor and the pump;
   a rotatable shaft assembly extending through the bore from the motor into the pump for driving the pump;
   a spring brake having helical turns, the spring brake being free of attachment to a sidewall of the bore and to the shaft assembly; and
   means for configuring and mounting the spring brake between the shaft assembly and the sidewall of the bore so as to allow free rotation of the shaft assembly in a driving direction and stop the shaft assembly from rotating in a reverse direction.

2. The ESP according to claim 1, wherein:
   the spring brake is located in a portion of the bore within the motor.

3. The ESP according to claim 1, wherein the means for configuring and mounting the spring brake comprises:
   a clamp that clamps a first portion of the spring brake rigidly to the shaft assembly for rotation with the shaft assembly in the driving direction; and wherein
   a second portion of the spring brake is closely spaced to the sidewall of the bore, and the helical turns are arranged such that commencing rotation of the shaft assembly in the reverse direction causes the second portion of the spring brake to move radially outward into frictional engagement with the sidewall of the bore to stop further reverse direction rotation of the shaft assembly.

4. The ESP according to claim 1, wherein the means for configuring and mounting the spring brake comprises:
   a tang extending from a first end of the spring brake and secured to the sidewall of the bore, preventing rotation of the spring brake with the shaft assembly; wherein
   rotation of the shaft assembly in the driving direction causes the helical turns to increase in diameter, creating a gap between the shaft assembly and the helical turns; and
   commencing rotation of the shaft assembly in the reverse direction causes the helical turns to decrease in diameter, closing the gap and gripping the shaft assembly to stop further reverse direction rotation of the shaft assembly.

5. The ESP according to claim 1, where the means for configuring and mounting the spring brake comprises:
   first and second portions integrally formed together;
   the first portion having the helical turns extending in a first direction;
   the second portion having the helical turns extending in a second direction;
   the inner diameter of the first portion being greater than an outer diameter of the shaft assembly during driving rotation of the shaft assembly;
   the outer diameter of the second portion being less than the outer diameter of the shaft assembly during driving rotation of the shaft assembly; and wherein
   commencing rotation of the shaft assembly in the reverse direction decreases the inner diameter of the first portion, causing the first portion to grip the shaft assembly, and increases the outer diameter of the second portion, causing the second portion to grip the sidewall of the bore to stop further reverse direction rotation of the shaft assembly.

6. The ESP according to claim 1, wherein the means for configuring and mounting the spring brake comprises:
   a first portion of the helical turns being closely spaced to the shaft assembly;
   a second portion of the helical turns being closely spaced to the sidewall of the bore;
   wherein the helical turns in the first and second portions are wound to allow driving direction rotation of the shaft assembly; and wherein
   commencing reverse rotation of the shaft assembly causes the first and second portions to move radially to grip the shaft assembly and the sidewall of the bore to prevent further reverse rotation of the shaft assembly.

7. The ESP according to claim 1, further comprising:
   a shear member extending between the shaft assembly and the sidewall of the bore, the shear member preventing any rotation of the shaft assembly while The ESP is being lowered into a well; and wherein
   the shear member is configured to shear when power is supplied to the motor, allowing the shaft assembly to rotate in the driving direction.

8. The ESP according to claim 1, wherein:
   the shaft assembly comprises a plurality of shafts connected together by splined couplings; and
   the shear member comprises a shear pin extending through a hole in the sidewall of the bore into a hole within one of the couplings.

9. The ESP according to claim 8, wherein the shear pin comprises:
   a threaded outer portion that engages threads within the hole in the sidewall of the bore;
   an inner portion within the hole in the coupling;
   an intermediate portion between the inner and outer portions;
   an annular groove surrounding the intermediate portion, providing a weak point in the shear pin; and
   a snap ring surrounding the inner portion of the shear pin to retain the inner portion in the hole in the coupling after the shear pin shears.

10. An electrical submersible well pump assembly (ESP), comprising:
    a pump,
    an electrical motor;
    a bore within the motor and the pump;
    a rotatable shaft assembly extending through the bore from the motor into the pump for driving the pump;
    a spring brake having helical turns and surrounding the shaft assembly in the bore;
    a first portion of the helical turns being closely spaced to the shaft assembly;
    a second portion of the helical turns being closely spaced to the sidewall of the hub;
    wherein the helical turns in the first and second portions are wound to allow driving direction rotation of the shaft assembly; and wherein
    commencing reverse rotation of the shaft assembly causes the first and second portions to move radially to grip the shaft assembly and the sidewall of the bore to prevent further reverse rotation of the shaft assembly.

11. The ESP according to claim 10, wherein:
the spring brake is free of attachment to the sidewall of the bore and to the shaft assembly.

12. The ESP according to claim 10, further comprising:
a shear member extending between the shaft assembly and the sidewall of the bore, the shear member preventing any rotation of the shaft assembly while the ESP is being lowered into the well; and wherein
the shear member is configured to shear when power is supplied to the motor, allowing the shaft assembly to rotate in the driving direction.

13. The ESP according to claim 12, wherein:
the shaft assembly comprises a plurality of shafts connected together by splined couplings; and
the shear member comprises a shear pin extending through a hole in the sidewall of the bore into a hole within one of the couplings.

14. The ESP according to claim 13, wherein the shear pin comprises:
a threaded outer portion that engages threads within the hole in the sidewall of the bore;
an inner portion within the hole in the coupling;
an intermediate portion between the inner and outer portions;
an annular groove surrounding the intermediate portion, providing a weak point in the shear pin; and
a snap ring surrounding the inner portion of the shear pin to retain the inner portion in the hole in the coupling after the shear pin shears.

15. The ESP according to claim 10, wherein the spring brake comprises:
a clamp that clamps a first portion of the spring brake rigidly to the shaft assembly for rotation with the shaft assembly in the driving and reverse directions; and wherein
a second portion of the spring brake is closely spaced to the sidewall of the bore, and the helical turns are wound such that commencing rotation of the shaft assembly in the reverse direction causes the second portion of the spring brake to move radially outward into frictional engagement with the sidewall of the bore to stop further reverse direction rotation of the shaft assembly.

16. The ESP according to claim 10, wherein the spring brake comprises:
a tang extending from a first end of the spring brake and secured to the sidewall of the bore, preventing any rotation of the spring brake with the shaft assembly; wherein
rotation of the shaft assembly in the driving direction causes the helical turns to increase in diameter, creating a gap between the shaft assembly and the helical turns; and
commencing rotation of the shaft assembly in the reverse direction causes the helical turns to decrease in diameter, closing the gap and gripping the shaft assembly to stop further reverse direction rotation of the shaft assembly.

17. An electrical submersible well pump assembly (ESP), comprising:
a pump;
an electrical motor;
a bore within the motor and the pump;
a rotatable shaft assembly extending through the bore from the motor into the pump for driving the pump;
a shear member extending between the shaft assembly and the sidewall of the bore, the shear member preventing rotation of the shaft assembly in any direction while the ESP is being lowered into the well and being configured to shear when power is supplied to the motor, allowing the shaft assembly to rotate;
a spring brake having helical turns and surrounding the shaft assembly in the bore;
a first portion of the helical turns being in proximity to the shaft assembly;
a second portion of the helical turns being in proximity to the sidewall of the bore; wherein
the helical turns in the first and second portions are wound to allow driving direction rotation of the shaft assembly; and
commencing reverse rotation of the shaft assembly causes the first and second portions to move radially to grip the shaft assembly and the sidewall of the bore to prevent further reverse rotation of the shaft assembly.

18. The ESP according to claim 17, wherein one end of the spring brake is affixed to the shaft assembly for rotation in both the driving and reverse directions.

19. The ESP according to claim 17, wherein one end of the spring brake is affixed to the sidewall of the housing.

20. The ESP according to claim 17, wherein the spring brake comprises:
a tang extending from a first end of the spring brake and secured to the sidewall of the bore, preventing any rotation of the spring brake with the shaft assembly; wherein
rotation of the shaft assembly in the driving direction causes the helical turns to increase in diameter, creating a gap between the shaft assembly and the helical turns; and
commencing rotation of the shaft assembly in the reverse direction causes the helical turns to decrease in diameter, closing the gap and gripping the shaft assembly to stop further reverse direction rotation of the shaft assembly.

* * * * *